United States Patent
Marino et al.

(10) Patent No.: US 7,656,140 B2
(45) Date of Patent: Feb. 2, 2010

(54) NONLINEAR DIGITAL CONTROL CIRCUIT AND METHOD FOR A DC/DC CONVERTER

(75) Inventors: Filippo Marino, Tremestieri Etneo (IT); Marco Minieri, Palermo (IT); Giuseppe Maria Di Blasi, Trapani (IT); Valeria Boscaino, Palermo (IT)

(73) Assignee: STMicroelectronics S.r.l., Agrate Brianza (mi) (IT)

( * ) Notice: Subject to any disclaimer, the term of this patent is extended or adjusted under 35 U.S.C. 154(b) by 133 days.

(21) Appl. No.: 11/488,452

(22) Filed: Jul. 18, 2006

(65) Prior Publication Data

US 2007/0024252 A1    Feb. 1, 2007

(30) Foreign Application Priority Data

Jul. 19, 2005    (EP)    ................... 05425515

(51) Int. Cl.
    *G05F 1/56*    (2006.01)
(52) U.S. Cl. ........................ 323/282; 323/284
(58) Field of Classification Search ................ 323/282, 323/283, 284, 285, 222, 271
    See application file for complete search history.

(56) References Cited

U.S. PATENT DOCUMENTS

| 5,956,239 | A | 9/1999 | Giacomini | |
|---|---|---|---|---|
| 6,356,063 | B1 | 3/2002 | Brooks | |
| 6,452,368 | B1* | 9/2002 | Basso et al. | 323/282 |
| 6,694,272 | B1 | 2/2004 | Zvonar | |
| 6,798,178 | B1* | 9/2004 | Bayadroun | 323/274 |
| 6,850,044 | B2* | 2/2005 | Hansen et al. | 323/266 |
| 6,911,808 | B1 | 6/2005 | Shimamori | |
| 7,002,327 | B2* | 2/2006 | Marino et al. | 323/283 |
| 7,023,190 | B2* | 4/2006 | Chapuis | 323/282 |

(Continued)

FOREIGN PATENT DOCUMENTS

EP    1 406 372  A1    4/2004

(Continued)

OTHER PUBLICATIONS

Barrado A., et al. "Linear-non-linear control (LnLc) for DC-DC buck converters: stability and transient response analysis" Applied Power Electronics Conference and Exposition, 2004. APEC '04. Nineteenth Annual IEEE Anaheim, CA, USA Feb. 22-26, 2004, Piscataway, NJ, USA, IEEE, vol. 2, Feb. 22, 2004, pp. 1329-1335, XP010703202 ISBN: 0-7803-8269-2.

(Continued)

*Primary Examiner*—Adolf Berhane
(74) *Attorney, Agent, or Firm*—Lisa K. Jorgenson; James H. Morris; Wolf, Greenfield & Sacks, P.C.

(57) ABSTRACT

A control circuit for a DC/DC converter has a linear-control loop, which receives a quantity to be controlled and a first reference quantity, and generates a modulation value. A nonlinear modulation unit is activated in presence of a variation of the quantity to be controlled higher than a preset intervention threshold and modifies in a nonlinear way the reference quantity supplied to the linear-control loop. In the case of large variation and of preset sign of the quantity to be controlled, the linear-control loop is deactivated, a signal for switching-off of the DC/DC converter is initially generated, and then a false steady-state-modulation value is supplied to the DC/DC converter.

22 Claims, 6 Drawing Sheets

U.S. PATENT DOCUMENTS

| | | | |
|---|---|---|---|
| 7,315,157 B2 * | 1/2008 | Chapuis | 323/282 |
| 2002/0048180 A1 | 4/2002 | Dancy et al. | |
| 2002/0075175 A1 | 6/2002 | Lin et al. | |
| 2004/0104716 A1 | 6/2004 | Marino et al. | |
| 2004/0207375 A1 | 10/2004 | Umemoto et al. | |
| 2007/0096704 A1 * | 5/2007 | Jain et al. | 323/282 |
| 2008/0042632 A1 * | 2/2008 | Chapuis et al. | 323/283 |

OTHER PUBLICATIONS

Capponi G., et al. "Modeling and simulation of new digital control for power conversion systems" $33^{RD}$ Annual IEEE Power Electronics Specialists Conference. PESC 2002. Conference Proceedings. Cairns, Queensland, Australia, Jun. 23-27, 2002, Annual Power Electronics Specialists Conference, New York, NY: IEEE, US, vol. 2 of 4. CONF. 33, Jun. 23, 2002, pp. 155-158, XP010596080 ISBN: 0-7803-7262-X.

* cited by examiner

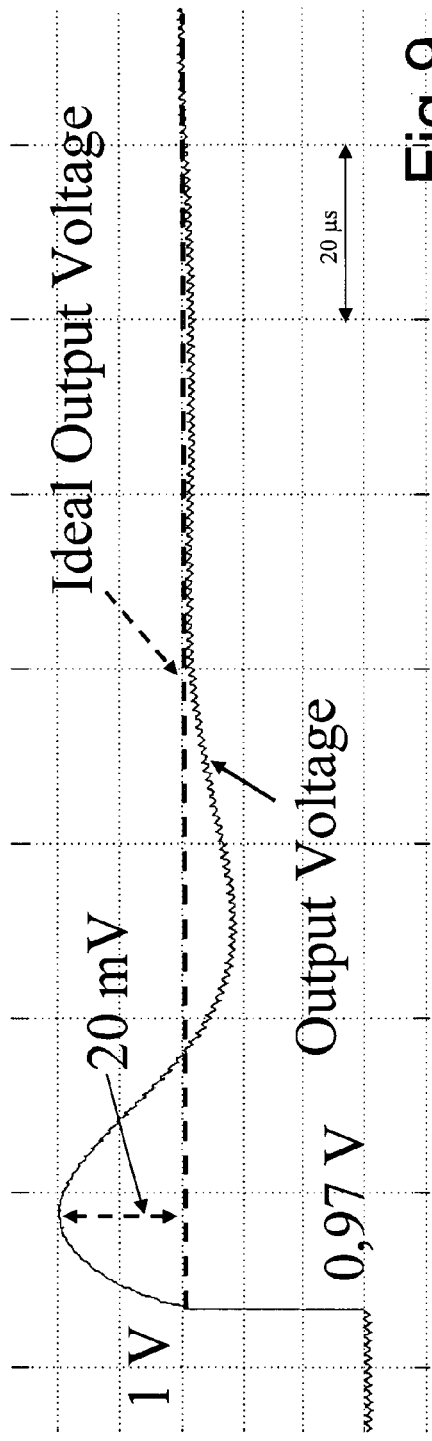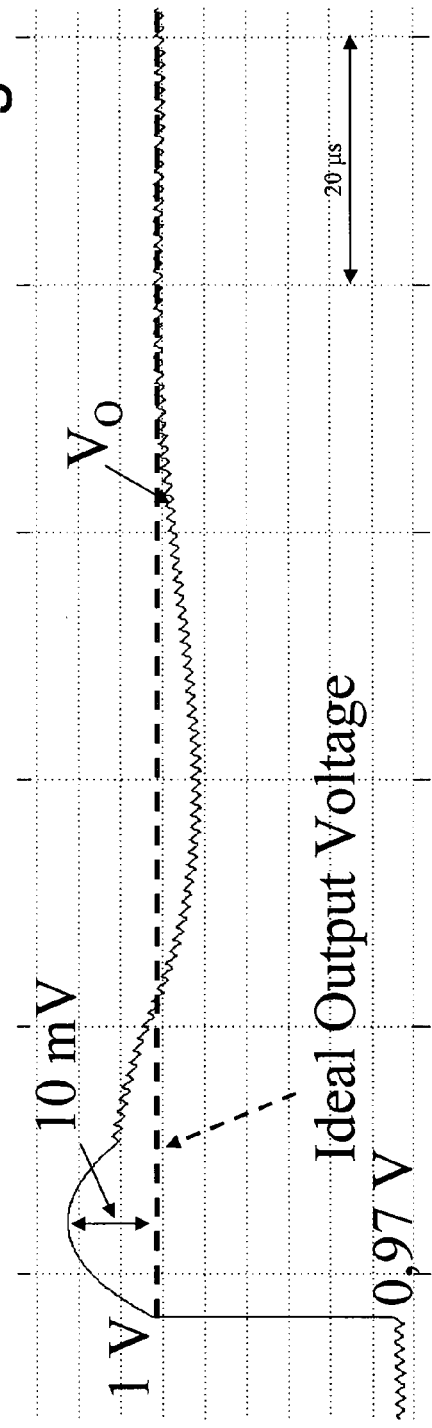

NONLINEAR DIGITAL CONTROL CIRCUIT AND METHOD FOR A DC/DC CONVERTER

BACKGROUND OF THE INVENTION

1. Field of the Invention

The present invention relates to a nonlinear digital control circuit and method for a DC/DC converter.

2. Discussion of the Related Art

In particular, and in a non-limiting way, the present invention relates to a control circuit usable in Voltage Regulator Module (VRM) applications, wherein the converter is used for supplying loads that absorb high current in a discontinuous way, and thus have a rapidly varying load. A typical VRM application is the supply of computer processors, which, according to the operations to be executed, require currents varying rapidly (in a few microseconds) from a few microamps to 100-120 A.

Currently, the most widespread control circuits are of an analog type, but circuits of a digital type are increasingly spreading since they have numerous advantages, such as lower sensitivity to disturbance, environmental variations, and variations of parameters and can be used in different applications, without any need for modifications.

The structure of a typical digital DC/DC converter of a step-down type that can be used for VRM applications is illustrated in FIG. 1. The converter 1 of FIG. 1 comprises a power switch S, for example a MOS transistor, having a first conduction terminal connected to a first pin of an inductor L. The second pin of the inductor L is connected to a first pin of a capacitor C, parallel-connected to a load 2, for example a microprocessor. A diode D is coupled between the first pin of the inductor L and the second pin of the capacitor C and forms, with the inductor L and the capacitor C, a filter F. A second conduction terminal of the power switch S receives a d.c. voltage $V_S$ of, for example, 12 V.

The voltage $V_O$ on the load 2 is supplied to a linear control stage 3, including an adder node 4, which receives the output voltage $V_O$, converted into digital format by a sampler/converter CONV A/D, and a reference voltage Vref and outputs an error signal Verr. The linear control stage 3 further comprises, cascade-connected to each other, an error amplifier EA receiving the error signal Verr, a control block, for example of a PID (Proportional-Integral-Derivative) type, a digital-to-analog converter DAC, and a PWM comparator, which receives, on a negative input, a ramp voltage W. The output X of the linear control stage 3 controls a driving circuit DR, which drives the gate terminal of the power switch S and causes switching-on and switching-off thereof.

When the load 2 varies, the output voltage $V_O$ undergoes a variation of opposite sign, which is detected by the linear control stage 3. This consequently modifies the on/off time (duty cycle) of the power switch S so as to bring the output voltage $V_O$ back to the steady-state value.

Notwithstanding the advantages, indicated above, of the digital technique as compared to the analog one, the digital technique is not readily applicable where the response speed of the converter is an essential requisite, as in the VRM applications mentioned above. In fact, the need to convert the input and output signals of the control circuit from analog to digital and vice versa and to numerically process the digital signals causes the digital technique to be intrinsically slower. On the other hand, for VRM applications, the system must be able to respond to extremely fast load variations, maintaining the output voltage within a preset range, in any operation condition. Here, identification of an appropriate corrective action to be inserted in the feedback line to increase the bandwidth of the system, and hence the speed of response, is not straightforward. In fact, this system is affected by the problem of the limit cycle, which is a phenomenon of instability that causes a considerable deterioration of the output-voltage waveform due to the difference between the resolutions of the A/D and D/A converters. The effects of the limit cycle can be reduced by reducing the gain, which however entails a reduction in the response speed.

Furthermore, in order to reduce the positive or negative voltage peaks when the load is rapidly modified, a solution has been proposed, referred to as AVP (Adaptive Voltage Positioning), which enables a reduction in the output-voltage swing in presence of load variations (see Modelling and simulation of new digital control for power conversion systems, G. Capponi, P. Livreri, M. Minieri, F. Marino; Electronics Specialists Conference, 2002, pesc. 02.2002 IEEE 33rd Annual, Volume 1, 2002, pp. 155-158). This solution envisages a variation in the reference voltage so as to exploit the entire tolerance window of the output voltage. In practice, upon detection of a high variation in output voltage or output current, the reference value is reduced or increased (according to whether there is an increase or a reduction in load) by a corrective value proportional to the maximum admissible current variation. Alternatively, for simplicity, the reference value can remain constant and the output voltage can be shifted up or down (in a direction opposite to the one expected for the reference voltage) by a quantity equal to the corrective value.

Using the AVP technique, the range of swing of the output voltage is reduced. However, the introduction of the AVP in the voltage-regulator circuit complicates the solution of the problem of the response speed.

In the literature, the problem of the response speed of a converter of the type indicated is generally solved by modifying the control loop or the converter topology (for instance, using a multiphase converter).

For example, A. Barrado, R. Vàzquez, A. Làzaro, J. Vàzquez, E. Olías <<New DC/DC Converter With Low Output Voltage And Fast Transient Response>>, 2003 IEEE, pp. 432-437, describes an example of nonlinear control inserted in a single-phase system. The solution proposed in this article comprises two DC/DC converters, one of which intervenes exclusively during load variations. By appropriately sizing the phase offset between the two converters, it is possible to obtain an improvement in the transient response. This solution has the considerable disadvantage that a converter is used only in presence of transients. In addition, from an analysis of the simulations, it may be inferred that the solution disclosed in this article would be far from effective in presence of AVP, in so far as the overshoots would completely nullify the advantages of the AVP. Furthermore, the solution has been presented for current variations not greater than 16 A, and consequently it is not applicable to situations where higher current variations (up to 80 A and above) are present.

Other solutions, such as bang-bang control (see, for example, U.S. 2002/0048180) are aimed at reducing the recovery time, seeking to maintain balance between the currents of various DC/DC converters operating in parallel. This technique is apparently not compatible with AVP and enables a certain hysteresis on the output voltage. In practice, this technique enables maximization of the response speed, causing an increase or decrease in the output current as fast as possible and is not concerned with oscillations on the output voltage.

The aim of the present invention is therefore to solve the problems that afflict known solutions, providing a control circuit of a digital type, which has a high response speed to load variations, reducing as much as possible overshooting and undershooting of the output voltage.

According to the present invention, a control circuit for a DC/DC converter is provided, comprising a linear-control loop, which has an input receiving a quantity to be controlled and a first reference quantity, and has an output supplying a modulation value, and a nonlinear modulation unit for said first reference quantity, said nonlinear modulation unit being activated in presence of a first variation of said quantity to be controlled higher than an intervention threshold.

The invention also provides a method for controlling a DC/DC converter receiving a modulation value and supplying a quantity to be controlled, comprising: acquiring said quantity to be controlled and a first reference quantity; regulating with a closed linear loop said quantity to be controlled on the basis of said first reference quantity; and detecting a first variation of said quantity to be controlled higher than an intervention threshold, and modulating, in a nonlinear way, said first reference quantity in presence of said first variation of said quantity to be controlled.

BRIEF DESCRIPTION OF THE DRAWINGS

For an understanding of the present invention, a preferred embodiment thereof is now described, purely as a non-limiting example, with reference to the attached drawings, wherein:

FIGS. 7-10 show comparative simulations for the output voltage that can be obtained with an embodiment of the circuit according to the invention as compared to the voltage that can be obtained with known circuits in different operating conditions.

DETAILED DESCRIPTION

Figure 2:
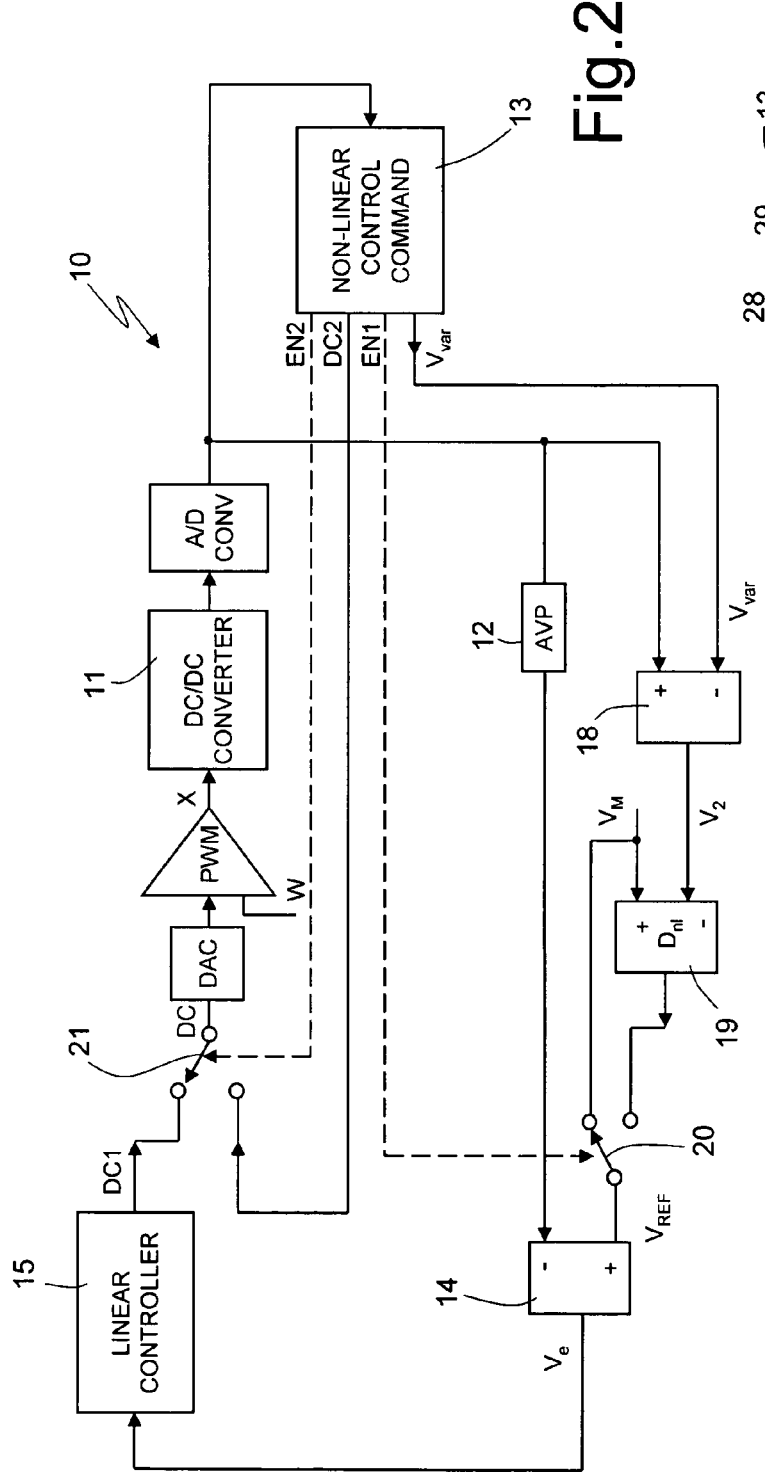
FIG. 2 is a block diagram of an embodiment of the control circuit according to the invention.

FIG. 2 shows a block diagram of a switching power supply 10 for VRM applications.

Figure 1:
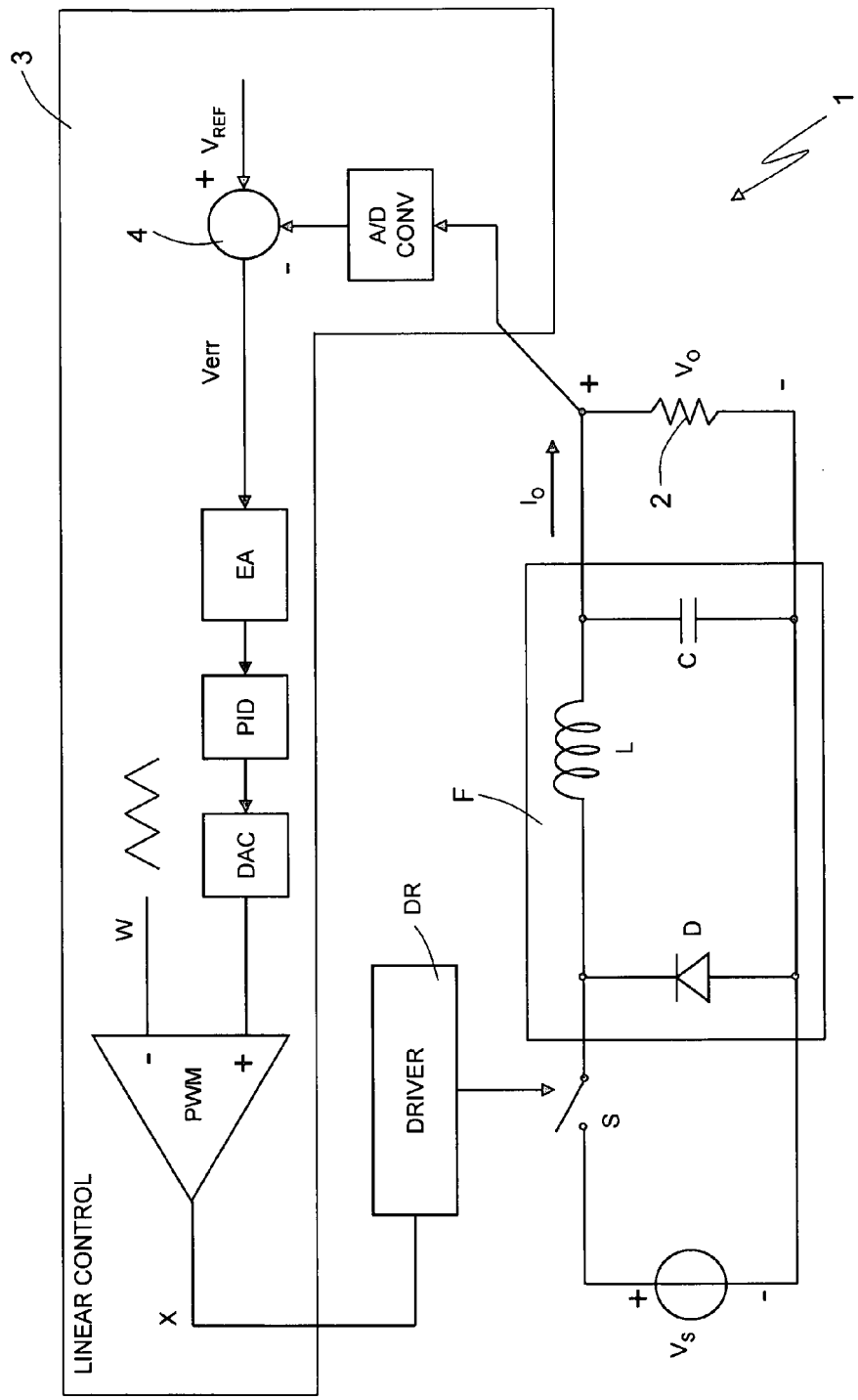
FIG. 1 is a block diagram of a control circuit applied to a DC/DC converter of a known buck type.

In detail, the switching power supply 10 comprises a DC/DC converter 11 made up, for example, of the driving circuit DR, the power switch S and the filter F for supply of the load 2 of FIG. 1. The DC/DC converter 11 receives a signal X, of an on/off type, and supplies an output voltage $V_O$, which, after being sampled and converted into digital format by a sampler/converter CONV A/D, is supplied both to a adaptive-voltage-positioning block AVP 12 and to a nonlinear-control command block 13.

The output of the block AVP 12 is connected to an inverting input of a first error amplifier 14 analogous to the group adder node 4/error amplifier EA of FIG. 1. The first error amplifier 14 moreover receives, on its non-inverting input, a variable reference voltage $V_{REF}$ and generates an error signal $V_e$ supplied to a linear controller 15, for example a PID, which generates a first duty-cycle signal DC1.

The nonlinear-control command block 13 generates, as explained in detail hereinafter a first enabling signal EN1, which enables the nonlinear control loop; a second enabling signal EN2, which disables the closed-loop control; a second duty-cycle signal DC2, which replaces the first duty-cycle signal DC1 upon deactivation of the closed-loop control; and a reference-modification signal $V_{var}$.

The reference-modification signal $V_{var}$ is supplied to an inverting input of an adder element 18, which receives, on a non-inverting input thereof, the output voltage $V_O$ of the DC/DC converter 11. The adder element 18 generates a loop voltage $V_l$ supplied to an inverting input of a second error amplifier 19 with gain $D_{nl}$. The second error amplifier 19 moreover receives, on its non-inverting input, a fixed reference voltage $V_{r1}$ and outputs a difference voltage $V_{r1}-V_l$ supplied to a first input of a first switch 20. The first switch 20 moreover has a second input, which receives the fixed reference voltage $V_{r1}$, and an output, supplying the variable reference voltage $V_{REF}$ to the first error amplifier 14. The first switch 20 is controlled by the first enabling signal EN1 so that the variable reference voltage $V_{REF}$ is either equal to the fixed reference voltage $V_{r1}$ or to the voltage difference $V_{r1}-V_l$, according to the logic value of the first enabling signal EN1.

The output of the linear controller 15 is connected to a first input of a second switch 21, which has a second input receiving the second duty-cycle signal DC2 and a control input receiving the second enabling signal EN2. The output of the second switch 21 is connected to a digital-to-analog converter DAC, the output whereof is connected to a positive input of a PWM comparator. As in FIG. 1, the PWM comparator receives, on its negative input, a ramp voltage W and generates the control signal X for the DC/DC converter 11.

Figure 3:
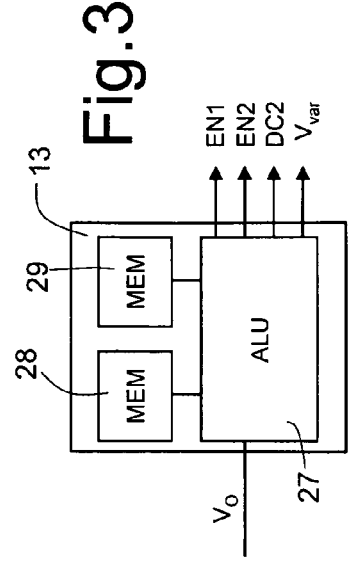
FIG. 3 shows the structure of a block of the circuit of FIG. 2.
Figure 4:
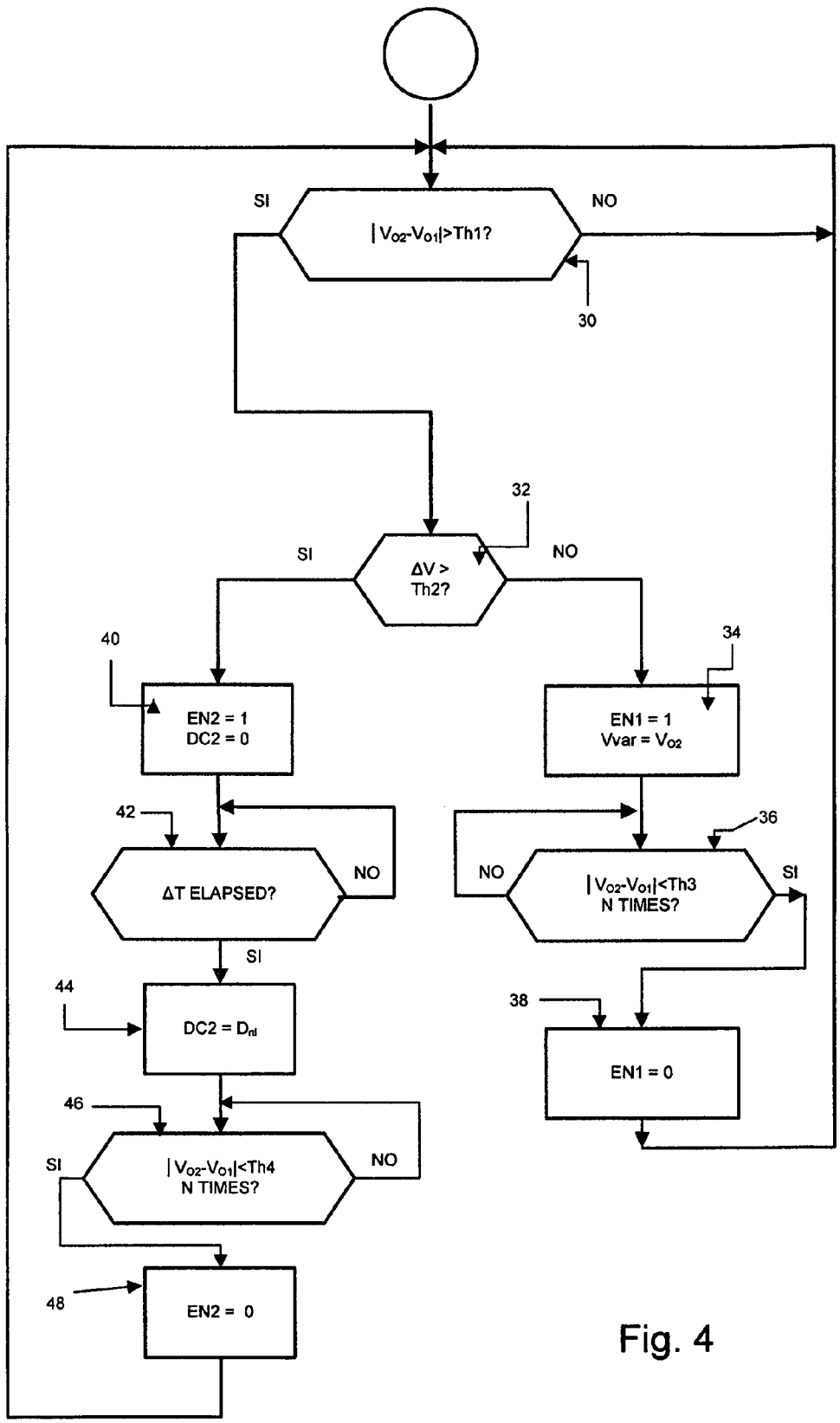
FIG. 4 is a flowchart of the operations performed by the block of FIG. 3.

The nonlinear-control command block 13 is, for example, implemented as shown in FIG. 3 and comprises a processing unit 27, for example an ALU, which generates the digital signals EN1, EN2, DC2 and $V_{var}$, as described in detail hereinafter with reference to FIG. 4; a program memory 28; and a data memory 29 connected to the processing unit 27.

The switching power supply 10 of FIG. 2 operates in a known way with AVP in the presence of small variations in the output voltage $V_O$ and carries out a control of a nonlinear type in the presence of high variations. In particular, in stationary conditions, the nonlinear-control command block 13 disables the nonlinear control and enables the linear control loop with AVP. In this step, the enabling signals EN1 and EN2 have a first value, such as to keep the switches 20, 21 in the position shown in FIG. 2, connecting the non-inverting input of the first error amplifier 14 to the fixed reference voltage $V_{r1}$ and the input of the digital-to-analog converter DAC to the output of the linear controller 15. Hence, in this step, the reference voltage $V_{REF}$ used by the first error amplifier 14 is equal to $V_{r1}$, and the switching power supply 10 regulates the output voltage with a small ripple around the desired value. In this step, the signals DC2 and $V_{var}$ are not generated or are meaningless.

Throughout operation of the switching power supply 10, the nonlinear-control command block 13 continues to monitor the output voltage $V_O$ of the DC/DC converter 11 and to compare it with a preset threshold value to detect whether any variation in load occurs. In fact, a load variation causes an instantaneous variation in the output voltage; namely, if there is a load reduction, the current required thereby decreases, and hence the output voltage $V_O$ increases; vice versa, if the load increases, the current required increases, and the output voltage $V_O$ decreases. Since the instantaneous voltage variation is proportional to the current variation, voltage monitoring enables any load variations to be detected immediately.

Upon detection of an output voltage $V_O$ variation greater than a preset threshold, the nonlinear-control command block 13 activates the nonlinear control loop. To this end, the first enabling signal EN1 switches to a second value and causes switching of the first switch 20 SO as to couple the non-inverting input of the first error amplifier 14 to the output of the second error amplifier 19. Furthermore, the nonlinear-control command block 13 supplies the adder element 18 with the reference-modification signal $V_{var}$, whose value is correlated to the instantaneous value of the output voltage $V_O$ when a load variation arises, for example the new value.

In this condition, the output value $V_I$ of the adder element 18 is $$V_I = V_O - V_{var},$$

the output of the second error amplifier 19 generates a modulated reference value $V_{mod}$:

$$V_{mod} = V_{r1} - D_{nl} V_I,$$

and the non-inverting input of the first error amplifier 14 receives a reference voltage $V_{REF}$ equal to the modulated reference value $V_{mod}$:

$$V_{REF} = V_{mod}.$$

Figure 5:
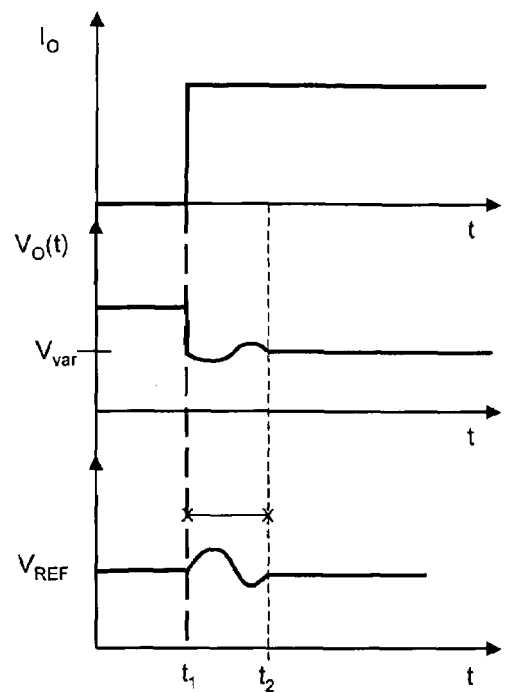
FIGS. 5 and 6 show the graphs of quantities of the control circuit according to the invention.

In practice, as may be noted from FIG. 5, in presence of a load variation, when the output voltage $V_O$ assumes lower values than the new steady-state value ($V_{var}$), the reference voltage $V_{REF}$ increases, causing an increase in the output voltage $V_O$. Likewise, when the output voltage $V_O$ assumes higher values than the new steady-state value $V_{var}$, the reference voltage $V_{REF}$ decreases, causing the decrease in the output voltage. The nonlinear control acts by modifying the error voltage $V_e$ so as to compensate for the oscillating pattern of the output voltage $V_O$. The addition of a gain $D_{nl}$ enables a faster stabilization of the output voltage $V_O$, and the choice of the gain value to be inserted in the loop is made on the basis of the results obtained from the simulations: the gain should be sufficiently high to enable the nonlinear control to have a bandwidth that is sufficient but should not be excessive in order to prevent any instability phenomena in the output voltage $V_O$.

In this way, a nonlinear control is implemented, which increases the response speed of the system, maintaining the output voltage within the limits imposed by the specifications, thus limiting any overshooting during a load variation.

The nonlinear control referred to may, however, not be sufficient in the event of very high negative current variations (for example, in a VRM control system capable on the whole of supplying currents of up to 120 A, the nonlinear control described above does not operate in a sufficiently fast way in the event of a current reduction of more than 80 A). Advantageously, in this case, the nonlinear-control command block 13 intervenes by modifying the duty cycle of the converter; namely, initially, the duty-cycle signal is set to zero, so as to switch off the power switch S in the DC/DC converter 11 (FIG. 1) and then, after a given time interval, the nonlinear-control command block 13 imposes a duty cycle corresponding to the value of the new steady-state condition (referred to as false steady state). In particular, upon detection of a high current reduction, the second enabling signal EN2 is set to a second logic value, causing switching of the second switch 21. Furthermore, the second duty-cycle signal DC2 is initially set at zero, and subsequently assumes a predetermined value, set in the design stage on the basis of the characteristics of the application (see FIG. 6). In this way, in this step, the digital-to-analog converter DAC receives the second duty-cycle signal DC2 instead of the first duty-cycle signal DC1 generated by the linear controller 15, and initially causes switching-off of the DC/DC converter 11 and subsequently assumes a value such as to enable the linear loop to recover after the unbalancing deriving from switching-off of the power switch. As soon as the system reaches an equilibrium condition, the nonlinear-control command block 13 detects it and reactivates the linear control, causing switching of the enabling signals EN1 and EN2 to their first value.

The operations performed by the switching power supply 10 of FIG. 2 are described hereinafter with reference to FIG. 4.

As indicated above, the output voltage $V_O$ of the DC/DC converter 11 is repeatedly sampled by the sampler/converter CONV A/D. The digital samples thus obtained are supplied to the processing unit 27, which compares each sample $V_{O2}$ with the immediately preceding sample $V_{O1}$ (step 30 in FIG. 4). As soon as the processing unit 27 detects that the absolute value of the difference $\Delta V = V_{O2} - V_{O1}$ between subsequent samples is higher than a preset threshold Th1 (for example corresponding to a variation of 25 A in the output current $I_O$-output YES from block 30), it checks whether the detected variation is higher than a second threshold Th2, for example corresponding to a variation of 80 A of the output current $I_O$ (step 32). If it is not (i.e., the voltage variation is negative, or positive but less than the threshold Th2, or, in other words, if the output current $I_O$ has increased or decreased by a value of less than a critical value), the processing unit 27 switches the first enabling signal EN1 to activate the nonlinear control, and stores the last detected sample $V_{O2}$ of the output voltage as a reference-modification value $V_{var}$. The reference-modification value $V_{var}$ is moreover sent to the adder element 18 (block 34).

Next, the nonlinear-control command block 13 continues to monitor the output voltage $V_O$ and remains in the nonlinear control mode until it detects an unstable condition. For example, the nonlinear-control command block 13 counts the number of consecutive times where the difference $\Delta V = V_{O2} - V_{O1}$ between subsequent samples is, in absolute value, greater than a third threshold value Th3 and considers that the system remains in an unstable condition until the counted number is below a preset value, for example 100 (output NO from step 36). As soon as the output of the DC/DC converter 11 reaches a steady state (output YES from step 36), the first enabling signal EN1 returns to the first value (here zero), step 38, and the nonlinear-control-command block 13 returns to the start, step 30, monitoring the variations of the output voltage $V_O$.

Instead, if the processing unit 27 detects that the voltage variation $\Delta V = V_{O2} - V_{O1}$ is greater than the second threshold Th2 (i.e., the output current $I_O$ drops below the critical value (output YES from step 32), the processing unit 27 causes switching of the second enabling signal EN2 for deactivating the closed-loop control, and the value of the second duty-cycle signal DC2 goes to zero (step 40). The DC/DC converter 11 is then turned off and remains in this condition for a preset time interval $\Delta T$, stored in the data memory 29 (FIG. 3) or given by the detection of a condition on the output voltage $V_O$, as described below. At the end of this time (output YES from step 42), the processing unit 27 modifies the value of the second duty-cycle signal DC2 on the basis of a preset value $D_{nl}$, stored in the data memory 29 or calculated on the basis of the operative conditions, step 44 (false steady-state condition).

Next, the nonlinear-control command block 13 continues to monitor the output voltage $V_O$ and remains in the false steady-state control until it detects an unstable condition, for example, as in step 36, it counts the number of times the distance between two subsequent samples is below, in absolute value, a fourth threshold value Th4. The fourth threshold value Th4 may for example be equal to the third threshold value Th3 (output NO from step 46). As soon as the regulator reaches a steady state (output YES from step 46), the second enabling signal EN2 returns to the first value (here zero, step 48) and the nonlinear-control command block 13 returns to the start (step 30), monitoring the variations of the output voltage $V_O$.

FIG. 5 shows the plot of the output current $I_O$, the output voltage $V_O$, and the reference voltage $V_{REF}$ on the non-inverting input of the first error amplifier 14 in presence of a load increase. As may be noted, the current required by the load suddenly increase at time $t_1$ and causes a corresponding rapid reduction in the output voltage $V_O$. Following upon intervention of the nonlinear control loop, the reference voltage $V_{REF}$ becomes variable, and the output voltage $V_O$ has a fluctuation around the new steady-state value $V_{var}$ up to the instant $t_2$, when the switching power supply 10 reaches a new equilibrium, after which linear control is re-established.

Figure 6:
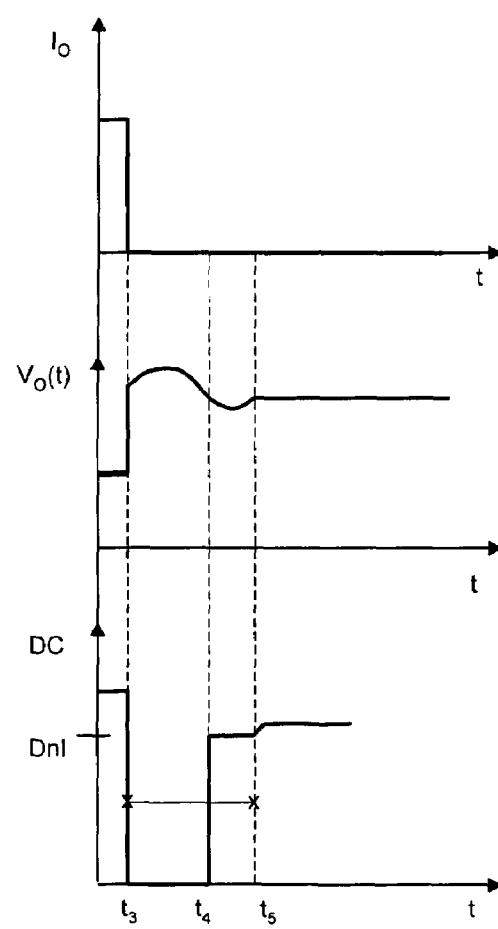

FIG. 6 shows, instead, the plot of the output current $I_O$, the output voltage $V_O$, and the value of the duty cycle DC for a load reduction that causes an output current reduction greater than the critical value. As may be noted, the current required by the load suddenly reduces at time $t_3$ and causes a corresponding rapid increase of the output voltage $V_O$. Consequently, the duty cycle DC is set to zero up to the time $t_4$ (the time interval $t_4$-$t_3$ corresponds to the time interval $\Delta T$ of the step 42 of FIG. 4). Then, the duty cycle DC is set at the false steady-state value $D_{nl}$ and remains there up to the instant $t_5$, when the system returns to equilibrium and the linear control is reactivated.

FIGS. 7-10 regard simulations made by the applicant for a switching power supply both without and with intervention of the nonlinear control loop and of the switching-off condition.

Figure 7:
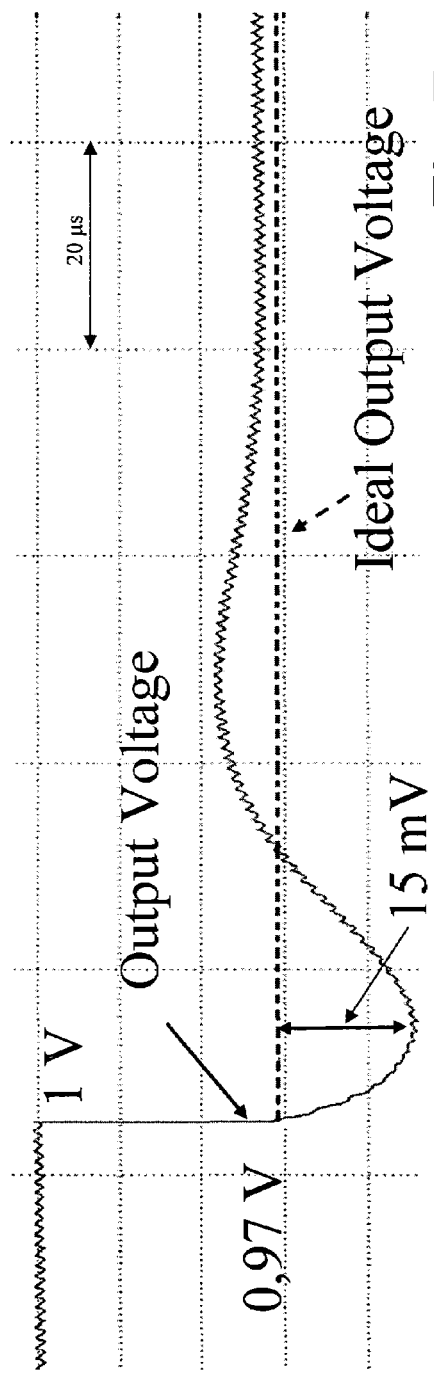

In detail, FIG. 7 shows the plot of the output voltage $V_O$ with respect to the ideal output voltage set by the AVP, obtainable from the switching power supply 10 when the nonlinear control has been disabled (EN1 always equal to 0). The simulation shown relates to a rapid variation of load from 1 mΩ to 1 kΩ. In this case, the output voltage passes rapidly from 1 V to 0.97 V and then oscillates around the ideal value with a maximum swing of 15 mV, with a settling time of approximately 130 μs.

Figure 8:
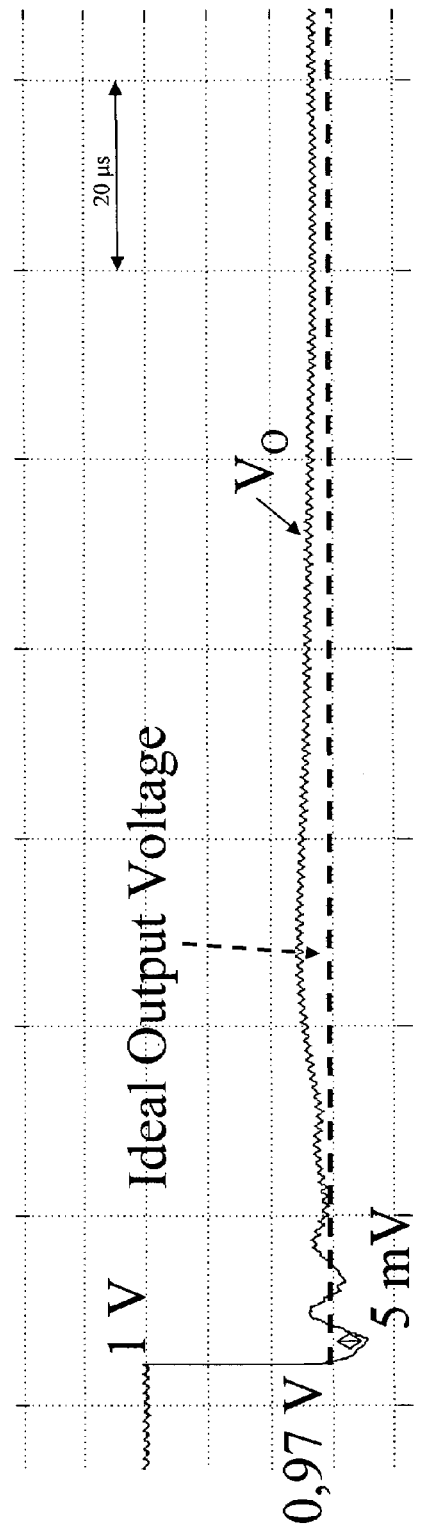

FIG. 8 shows the plot of the output voltage $V_O$ and of the ideal output voltage obtainable from the switching power supply 10 of FIG. 2 with nonlinear control enabled, in the same conditions and with the same parameters as in FIG. 7. Here, the maximum variation of the output voltage is 5 mV, and the settling time is approximately 20 μs. In practice, the nonlinear control enables reduction of the undershoot (from 20 mV to approximately 5 mV), and, moreover, during the transient the output voltage exceeds the new steady-state value only marginally. Furthermore the settling time is far below that of FIG. 7.

FIG. 9 shows the plot of the output voltage $V_O$ and of the ideal output voltage without nonlinear control and without opening the control loop in the case of high reduction in the current required by the load. As may be noted, the output voltage has a swing of approximately 20 mV with respect to the desired value, and a settling time of 75 μs.

FIG. 10 shows the plot of the same quantities in presence of the described nonlinear control. Also here, from a comparison between FIGS. 9 and 10 it is evident that the overshoot is reduced to approximately 10 mV (from 1.003 V in FIG. 9 to 1.012 V in FIG. 10), and moreover the recovery time is halved.

The advantages of the regulator and the method described herein are evident from the foregoing description. In particular, it is emphasized that the described solution enables an increase in the response speed of the system, maintaining the output voltage within the limits imposed by the specifications, limiting the overshoots on account of a load variation. The use of the nonlinear control solves the problem of the response speed irrespective of the bandwidth of the system, thus enabling sizing of the system with a considerably reduced gain so as to render the effects of the limit cycle negligible. In addition, all the information necessary for the nonlinear control are derived from the output voltage of the converter appropriately digitized so that the system is reliable and does not require any intervention from outside.

Finally, it is clear that numerous modifications and variations can be made to the circuit and to the control method described and illustrated herein, all of which fall within the scope of the invention, as defined in the annexed claims. In particular, even though the described system refers to the control of a converter equipped with a single power switch, the invention is applicable also to so-called multiphase systems equipped with a plurality of power switches, designed to provide a fraction of the current required and controlled by driving signals X phase-shifted to each other. In this case, in presence of a major reduction in the required current, greater than the critical value, all the power switches are turned off simultaneously and then phase-shiftedly turned on according to the new duty cycle. To this end, the second enabling signal EN2 can be used directly to obtain simultaneous switching-off of the phases.

In addition, as mentioned above, the duration of the switching-off of the power switch in the event of marked reduction of the current requirement can be determined on the basis of the conditions of circuit operation, instead of being preset. For example, the processing unit 27 can store the instantaneous value of the output voltage $V_O$ when it detects a marked variation, continue monitoring the output voltage $V_O$, and reactivate the power switch in a false steady-state condition as soon as the instantaneous output voltage $V_O$ reaches the stored value (for instance, correlated to a preset current value) or the difference between them is below a preset threshold.

Finally the false steady-state value $D_{nl}$ of the second duty-cycle signal DC2 can be determined on the basis of the desired duty cycle, taking into account the desired output voltage, the supply voltage, and any possible losses in the filter F.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A control circuit for a DC/DC converter, comprising:
   a linear-control loop, which has an input receiving a quantity to be controlled and a first reference quantity, and has an output supplying a modulation value; and
   a nonlinear modulation unit comprising a first selector configured to receive said first reference quantity and a modulated reference quantity and having an output connected to said linear-control loop, said nonlinear modulation unit being activated in response to detecting a first variation of said quantity to be controlled higher than an intervention threshold,
   wherein said nonlinear modulation unit generates a modulation-modification quantity, supplied to an output of said control circuit, the modulation-modification quantity initially supplying a switching-off value for said DC/DC converter and subsequently a false steady-state-modulation value.

2. The control circuit according to claim 1, wherein said linear-control loop and said nonlinear modulation unit are of digital type.

3. The control circuit according to claim 1, wherein said linear-control loop comprises a voltage-adaptive positioning module, which receives said quantity to be controlled; an error-amplification module, cascade-coupled to said adaptive positioning module and receiving said first reference quantity; and a linear controller cascade-coupled to said error-amplification module.

4. The control circuit according to claim 1, wherein said nonlinear modulation unit receives said quantity to be controlled and said first reference quantity, and generates said modulated reference quantity according to said quantity to be controlled and according to said first reference quantity.

5. The control circuit according to claim 4, wherein said nonlinear modulation unit comprises a control module receiving said quantity to be controlled and generating a first enabling signal in presence of said first variation of said quantity to be controlled; a subtractor element receiving said quantity to be controlled and a regulation value and generating a loop quantity; a differential element receiving said loop quantity and said first reference quantity and generating said modulated reference quantity.

6. The control circuit according to claim 5, wherein said regulation value is equal to the instantaneous value of said quantity to be controlled when said nonlinear modulation unit is activated.

7. The control circuit according to claim 4, wherein said control module deactivates said linear-control loop in presence of a second variation of said quantity to be controlled of a preset sign and greater than a second preset threshold, said second preset threshold being greater than said intervention threshold.

8. The control circuit according to claim 1, wherein said nonlinear modulation unit further comprises a second selector arranged between said linear-control loop and said output of said control circuit, said second selector being controlled by said control module for replacing said modulation value with said modulation-modification quantity in presence of said second variation of said quantity to be controlled.

9. A method for controlling a DC/DC converter receiving a modulation value and supplying a quantity to be controlled, comprising:
acquiring said quantity to be controlled and a first reference quantity;
regulating with a closed linear loop said quantity to be controlled on the basis of said first reference quantity; and
detecting a first variation of said quantity to be controlled higher than an intervention threshold;
generating a modulation-modification quantity if said quantity to be controlled exceeds a second threshold, the modulation-modification quantity having initially a switching-off value for said DC/DC converter and subsequently a preset false steady-state-modulation value, said second threshold being larger than said intervention threshold; and
modulating, in a nonlinear way, said first reference quantity in presence of said first variation of said quantity to be controlled, wherein the modulation-modification quantity replaces said first reference quantity when said quantity to be controlled exceeds said second threshold.

10. The method according to claim 9, wherein said modulating step comprises generating a modulated reference quantity according to said quantity to be controlled and according to said first reference quantity.

11. The method according to claim 9, wherein said step of generating a modulated reference quantity comprises:
generating a loop quantity proportional to a difference between said quantity to be controlled and a preset regulation value; and
generating said modulated reference quantity on the basis of a difference between said loop quantity and said first reference quantity.

12. The method according to claim 9, comprising:
deactivating said step of regulating with closed linear loop upon detection of a positive variation of said quantity to be controlled greater than a second preset threshold, said second preset threshold being greater than said preset intervention threshold.

13. A circuit, comprising:
a first control loop configured to provide a first modulation value when a circuit input value is below a first voltage threshold; and
a second control loop comprising a first selector configured to receive a first reference quantity and a modulated reference quantity and having an output connected to said first control loop, said second control loop being configured to provide a second modulation value when the circuit input value is less than a second voltage threshold and a third modulation value when the circuit input value is greater than said second voltage threshold,
wherein the first control loop provides linear control of a DC/DC conversion of an input and the second control loop provides non-linear control of the DC/DC conversion of the input.

14. The circuit of claim 13, wherein the circuit operates in the first control loop or the second control loop based on a switch driven by a control unit.

15. The circuit of claim 13, wherein when a voltage of the circuit exceeds a third threshold, the second control loop operates using the third modulation value.

16. The circuit of claim 13, wherein the second control loop operates using the second modulation value or the third modulation value based on a second switch driven by a control unit.

17. The circuit of claim 14, wherein the switch selects a first reference quantity in the first control loop and the switch selects a second reference quantity in the second control loop.

18. The circuit of claim 17, wherein the second reference quantity is generated by an adder and an amplifier, wherein the amplifier receives the first reference quantity as an amplifier input.

19. The circuit of claim 13, wherein the first modulation value and the second modulation value are generated using adaptive voltage positioning.

20. The circuit of claim 13, wherein the third modulation value initially has a switch-off value and subsequently a preset steady-state value.

21. A method, comprising:
monitoring a quantity supplied to a circuit;
regulating the quantity in a linear loop of the circuit when a magnitude of the quantity is less than a first threshold value;
regulating the quantity in a non-linear loop of the circuit using a first modulation value when the magnitude of the quantity is greater than the first threshold value; and
regulating the quantity in the non-linear loop using a second modulation value when the magnitude of the quantity is greater than a second threshold value, the second threshold value being greater than the first threshold value, wherein the circuit provides an output proportional to the quantity supplied to the circuit, the output being based on regulating the quantity in the linear loop or the non-linear loop.

22. The method of claim 21, wherein the second modulation value initially has a switching-off value for the circuit and subsequently a preset false modulation value.

* * * * *

UNITED STATES PATENT AND TRADEMARK OFFICE
CERTIFICATE OF CORRECTION

PATENT NO. : 7,656,140 B2  Page 1 of 1
APPLICATION NO. : 11/488452
DATED : February 2, 2010
INVENTOR(S) : Marino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 136 days.

Signed and Sealed this

Thirtieth Day of November, 2010

David J. Kappos
*Director of the United States Patent and Trademark Office*